United States Patent [19]

Andersson et al.

[11] Patent Number: 4,857,687

[45] Date of Patent: Aug. 15, 1989

[54] INDUCTION APPARATUS FOR HEATING EDGE PORTION OF BILLET

[75] Inventors: Lars Andersson; Zdenek Klimt, both of Västerås, Sweden

[73] Assignee: Asea Aktiebolag, Västerås, Sweden

[21] Appl. No.: 257,142

[22] Filed: Oct. 12, 1988

Related U.S. Application Data

[63] Continuation of Ser. No. 18,600, Feb. 25, 1987, abandoned.

[30] Foreign Application Priority Data

Mar. 3, 1986 [SE] Sweden ............................. 8600940

[51] Int. Cl.⁴ .............................................. H05B 6/40
[52] U.S. Cl. ............................. 219/10.57; 219/10.43; 219/10.71; 219/10.79
[58] Field of Search ............... 219/10.57, 10.71, 10.79, 219/10.43, 10.61 R

[56] References Cited

U.S. PATENT DOCUMENTS

| | | | |
|---|---|---|---|
| 2,401,899 | 6/1946 | Bierwirth et al. | 219/10.61 R X |
| 2,479,341 | 8/1949 | Gehr et al. | 219/10.79 |
| 3,562,470 | 2/1971 | Bobart et al. | 219/10.61 R X |
| 3,684,851 | 8/1972 | Reinke et al. | 219/10.43 |
| 3,827,275 | 8/1974 | Suttan et al. | 219/10.79 X |
| 4,363,946 | 12/1982 | Busemann | 219/10.43 X |
| 4,458,125 | 7/1984 | Leis | 219/10.43 X |
| 4,458,127 | 7/1984 | Pusateri et al. | 219/10.43 X |
| 4,587,392 | 5/1986 | Chausse et al. | 219/10.43 X |
| 4,590,346 | 5/1986 | Sugihara et al. | 219/10.43 |
| 4,627,259 | 12/1986 | Andersson et al. | 219/10.43 X |

Primary Examiner—Philip H. Leung
Attorney, Agent, or Firm—Kenyon & Kenyon

[57] ABSTRACT

The invention relates to a device for heating billets, strip or sheet-metal, the device including one or more inductive edge heaters to heat the edges of a billet on its way from a continous casting machine, or strip or sheet-metal coming from a hot-rolling mill, arranged to surround the outer parts of the edges in order to heat them. The induction heater(s) comprises(s) one or more flat spiral element(s) (1) bent around the side edges of the billet, etc, and also at least one vertically placed, flat coil (4), located substantially parallel with the side edge (5) of the billet, etc.

1 Claim, 3 Drawing Sheets

INDUCTION APPARATUS FOR HEATING EDGE PORTION OF BILLET

This application is a continuation of application Ser. No. 018,600, filed Feb. 25, 1987, abandoned.

The present invention relates to a means for heating billets, strip or sheet-metal, said means including one or more inductive edge heaters to heat the edges of a billet on its way from a continuous casting machine, or strip or sheet-metal coming from a hot-rolling mill or pair, arranged to surround the outer parts of the edges in order to heat them.

A similar device has been described in our U.S. application Ser. No. 802,724, the heater(s) constituting one or more bent, flat spiral elements (coils), arranged so that the outermost parts of the edges will pass a greater portion of the coil than parts located further from the edges, the outer edge thus being heated more than the inner parts, and that the edges are arranged to be heated to a temperature corresponding approximately to that of the rest of the billet, sheet, strip, etc.

The induction heaters are arranged to surround the billet on three sides on its passage to a rolling mill, and are suitably arranged to be supplied with single-phase mains frequency or high frequency (1000–3000 HZ).

In processes where flat products are to be kept hot along the production line, they cool more quickly at the edges than in the rest of the product. Often the heating means described above are sufficient. However, as is also apparent from a study of temperatures from calculated temperature distribution for slabs or other flat products, sometimes a more complete compensation for the loss of heat at the edges is required.

The invention is directed towards a solution of these problems and is characterised in that the induction heater(s) comprise(s) one or more flat spiral element(s) bent around the side edges of the billet, etc, and also at least one vertically placed, flat coil, located substantially parallel with the side edge of the billet, etc.

FIG. 1 shows a typical temperature ratio prior to this edge heating. x is the distance from the outer edge and b is the width. $\Delta T$ is the difference between the mean temperature at various distances (x) from the edge and the mean temperature at the centre of the billet. $x<b/2$. After transport through the means, the energy supplied to the billet will be typically distributed as $\Delta T$.

In such a means a substantially complete temperature and heat-loss compensation will be obtained along the edges of the flat billets to be further worked.

Figure 2:
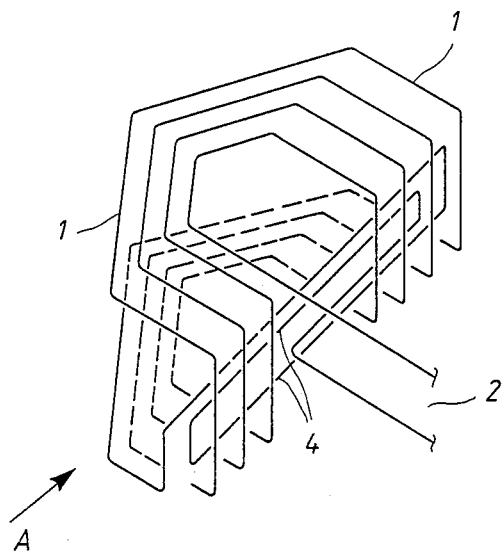
FIG. 2 is a perspective view of a coil arrangement of this invention.
Figure 3:
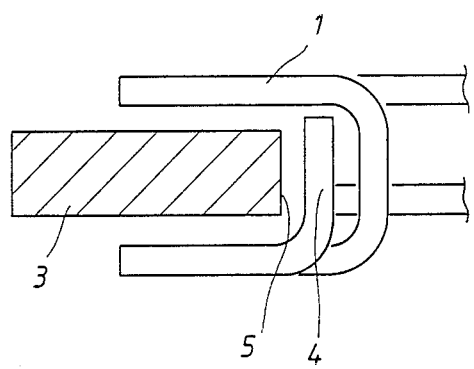
FIG. 3 shows the billet edge in cross-section and the coils in elevation.

FIG. 2 shows a triangular coil 1 surrounding a side edge on three sides. The coil 1 is supplied with single-phase (2) mains frequency or high frequency (1000–3000 Hz). 3 is one side edge of a flat billet (FIG. 3), such as a slab or the like, which is thus surrounded on three sides by the coil 1. The turns of the coil 1 are wound triangularly so that the outermost parts of the side edge 3 pass more turns of the coil than the parts located further in (see the above-mentioned patent specification).

One or more vertical flat coils 4 are arranged in series with or parallel to the coil 1, parallel to the side edge and this or these coil(s) is/are arranged, together with the coils 1, within the same roll gap.

The combination of a triangular coil 1 with a vertical flat coil 4 at the edge sides 5 enables the temperature of the edge and corners to be increased even further.

The combination according to FIG. 2 is thus effected so that the triangular coil is placed in the roll gap in a conveyor belt and the flat coil 4 in the same gap. The space requirement for the heater in longitudinal direction is thus limited.

Figure 4:
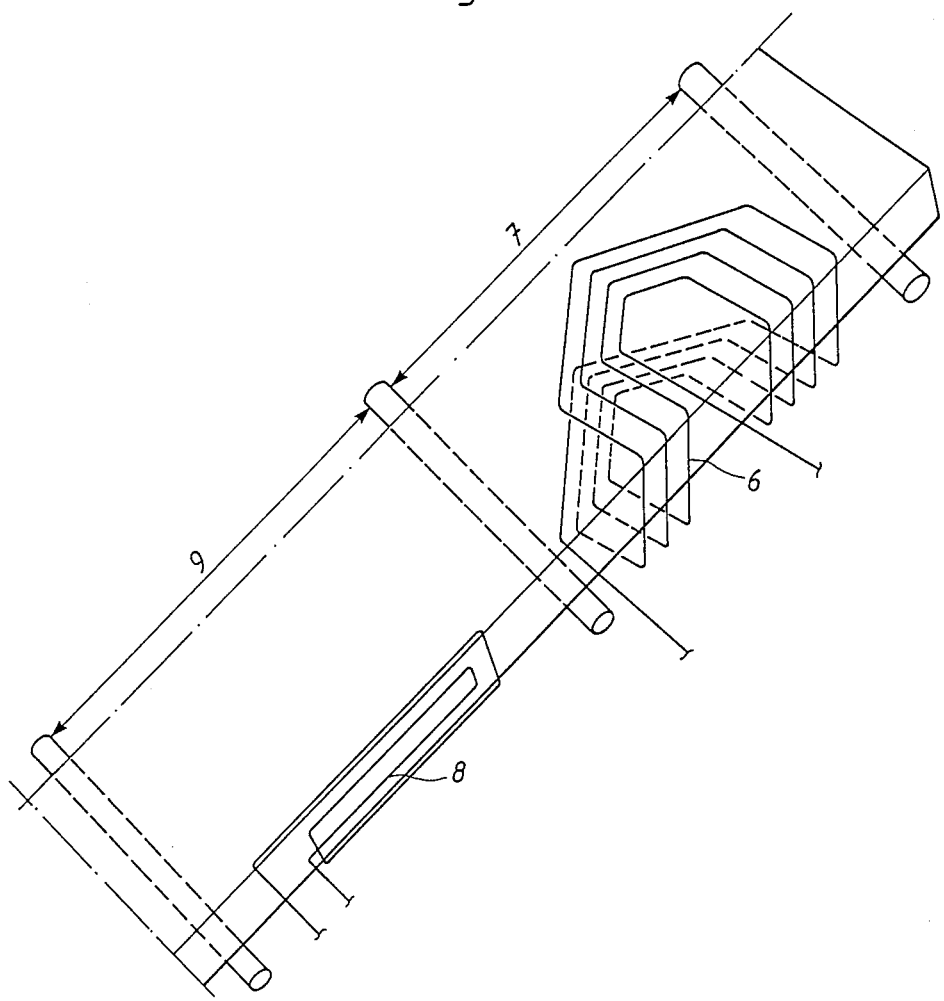
FIG. 4 is a perspective view showing the coils as separate elements.

Instead, the triangular coil 6 may be located in an adjacent (or other) roll gap 7, while the flat coil 8 is located in roll gap 9. See FIG. 4.

Figure 1A:
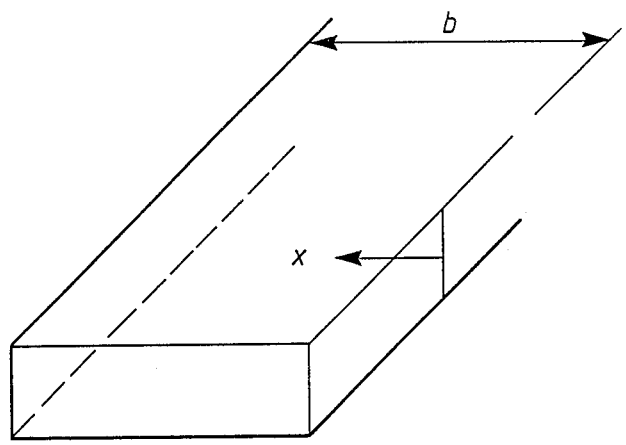
FIGS. 1a and 1b show a typical temperature gradient in a billet requiring edge heating.
Figure 1B:
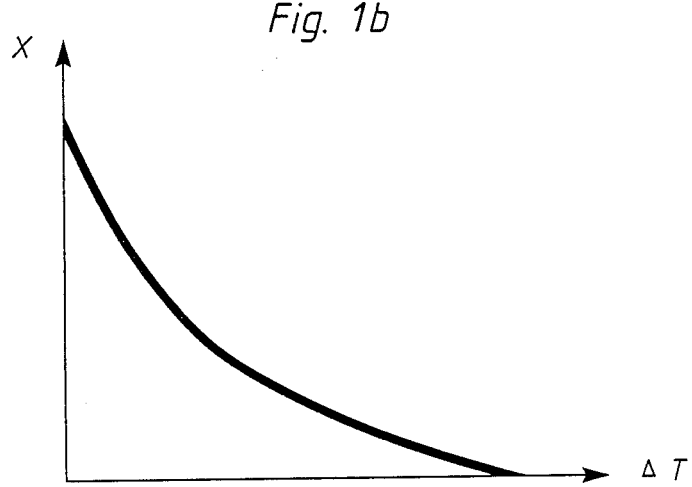

The roll partition (7, 9) can then be kept shorter than is the case according to FIG. 1. This may be of significance in the case of silicon steels, for instance, which are malleable at working temperature.

In this application the supply sources for the various coils (6, 8) may be separate, variation of the field strength and/or frequency being effected individually.

The means according to the above can be varied in many ways within the scope of the following claims.

We claim:

1. An apparatus for heating a side edge portion of a traveling flat billet, and comprising a first induction coil bent into a U-shaped form having horizontal sides which are triangular in shape and interspaced and positioned to overlie the mutually opposite sides of a flat billet travelling between said horizontal sides of said first induction coil, and a second induction coil which is flat in shape and positioned in a vertical plane parallel to the billet's side edge, the second coil having a vertical height less than the interspacing of the horizontal sides of the first coil so that the second coil can be positioned between the horizontal sides of the first coil, the second coil being positioned at least adjacent to the first coil and co-operating with the first coil.

* * * * *